Figure 1:
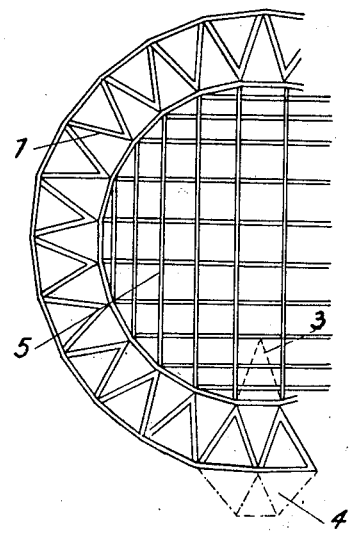

April 23, 1929.  J. SCHWENGLER  1,710,195

HOLLOW BODY, ESPECIALLY FOR AIRSHIPS

Filed June 13, 1928

Inventor:
Johannes Schwengler
By B. Singer
atty.

Patented Apr. 23, 1929.

1,710,195

UNITED STATES PATENT OFFICE.

JOHANNES SCHWENGLER, OF STRELITZ, GERMANY.

HOLLOW BODY, ESPECIALLY FOR AIRSHIPS.

Application filed June 13, 1928, Serial No. 285,056, and in Germany June 11, 1925.

In the manufacture of great hollow bodies of small weight, as especially needed for the gas bodies of air ships, the body mantles can only be constructed with sufficient rigidity and small weight by aid of stiffening rings which extend between the single gas balloons. This construction becomes light, but the stiffening rings diminish the useful gas volume to an undesirable extent.

In the former construction with rigid mantle it has been common to use ball shaped balloons and intermediate ring ballons of triangular cross section, but this construction had too much weight per lift.

The invention consists therein, that the body is composed of stiff rings without tension members and these rings are filled up by gas balloons. Hereby a fundamental saving of weight is attained as the essential weight advantage of the ring, stiff in itself, is in no way diminished by losses of lift arising from great dead spaces without gas content.

A valuable detail of the invention further consists in providing the stiffening rings with wires without tension or with other framework covering the body cross section so as to sustain the end faces of the gas balloons. The said wire work or frame work, being not needed for stiffening the ring, becomes in this case an extremely light construction of very thin wires or struts and nevertheless it suffices entirely for sustaining the balloons.

The invention is illustrated in the drawing, in which—

Figure 2:
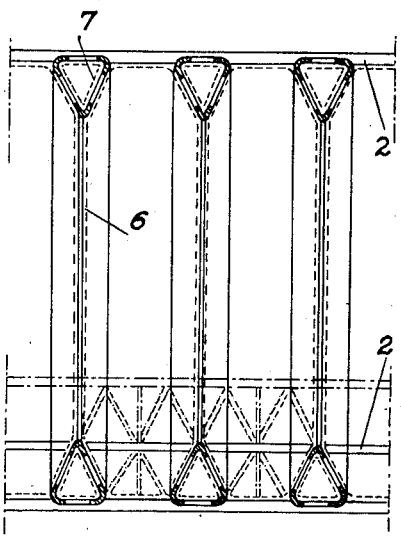

Fig. 1 is a cross section of an air ship body,
Fig. 2 is a partial longitudinal section.

The stiffening rings are composed as frame works of struts 1 in essentially annular shapes and with triangular cross sections. The radial dimension of the triangular cross-section is for instance 6 m. for a ring of 45 m. outer diameter. According to the invention the inner space of the rings is filled up by annular balloons and thereby made useful for producing lift. The rings are joined to each other by longitudinal girders 2. On the lower side of the body the longitudinal girders 2 may be completed to form a gang way 3 and further gangways or fuselages 4, so that hereby a specially rigid keel of the body is produced.

The areas confined by the inner circumferential girders of the stiffening rings are transversed by frame works, for instance by wires 5, which are loosely inserted without initial tension and the gauge of which needs only to be dimensioned with respect to absolute resistance but not with respect to elastical deformation. The said frame works serve only for sustaining the gas balloons 6 arranged between the rings, especially for obviating, in case one balloon is emptied and without pressure, the tendency of the neighboured balloons to penetrate into the space appertaining to the empty balloon.

I claim:

1. A hollow body, especially for air ships, comprising the combination stiffening rings, which are rigid without inner tension members, longitudinal girders connecting said stiffening rings, gas balloons inserted between said rings, and further gas balloons inserted in the cross sectional spaces of said rings.

2. A hollow body, especially for air ships, comprising in combination stiffening rings of triangular cross sections with the base on the outer circumference, which rings are rigid without inner tension members, longitudinal girders connecting said stiffening rings, gas balloons inserted between said rings, and further gas balloons inserted in the cross sectional spaces of said rings.

3. A hollow body, especially for air ships, as claimed in claim 1, wherein to the inner peripheral girders of the stiffening rings flat frame works without initial tension are connected so as to cover the areas enclosed by said girders and sustain the main gas balloons.

4. A hollow body, especially for air ships, as claimed in claim 1, wherein to the inner peripheral girders of the stiffening rings flat wire works without initial tension are connected so as to cover the areas enclosed by said girders and sustain the main gas balloons.

In witness whereof I affix my signature.

JOHANNES SCHWENGLER.